(12) United States Patent
Naik et al.

(10) Patent No.: US 7,336,675 B2
(45) Date of Patent: Feb. 26, 2008

(54) OPTIMIZED BACK-TO-BACK ENQUEUE/DEQUEUE VIA PHYSICAL QUEUE PARALLELISM

(75) Inventors: Uday R. Naik, Fremont, CA (US); Prashant R. Chandra, Sunnyvale, CA (US); Alok Kumar, Santa Clara, CA (US); Ameya S. Varde, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 895 days.

(21) Appl. No.: 10/743,392

(22) Filed: Dec. 22, 2003

(65) Prior Publication Data

US 2005/0201398 A1    Sep. 15, 2005

(51) Int. Cl.
*H04L 12/28* (2006.01)
*H04L 12/54* (2006.01)
(52) U.S. Cl. .................................. 370/412; 370/428
(58) Field of Classification Search ........ 370/412–418, 370/428, 429
See application file for complete search history.

(56) References Cited

U.S. PATENT DOCUMENTS

| | | | | |
|---|---|---|---|---|
| 5,136,582 A | * | 8/1992 | Firoozmand | 370/400 |
| 5,233,606 A | * | 8/1993 | Pashan et al. | 370/418 |
| 5,768,270 A | * | 6/1998 | Ha-Duong | 370/388 |
| 6,137,807 A | * | 10/2000 | Rusu et al. | 370/429 |
| 6,219,352 B1 | * | 4/2001 | Bonomi et al. | 370/417 |
| 2001/0007561 A1 | * | 7/2001 | Aznar et al. | 370/409 |

\* cited by examiner

*Primary Examiner*—Frantz Coby
*Assistant Examiner*—Juvena W Loo
(74) *Attorney, Agent, or Firm*—Blakely, Sokoloff, Taylor & Zafman LLP

(57) ABSTRACT

A method and apparatus to receive a plurality of packet from an inflow of a single packet flow. In response to receiving the plurality of packets, a plurality of packet pointers is enqueued into multiple physical queues. Each of the plurality of packet pointers designates one of the plurality of packets from the single packet flow. The plurality of packet pointers are dequeued from the multiple physical queues to transmit the plurality of packets along an outflow of the single packet flow.

23 Claims, 6 Drawing Sheets

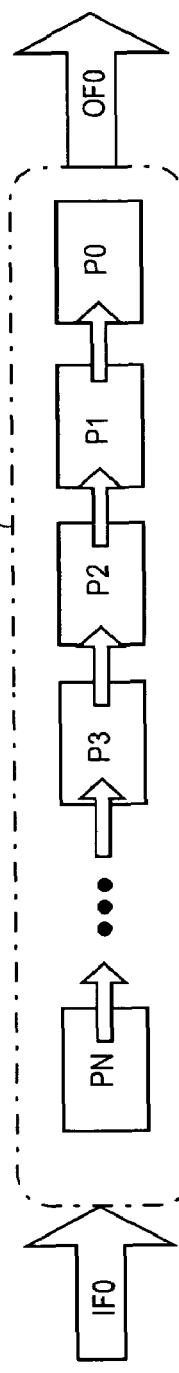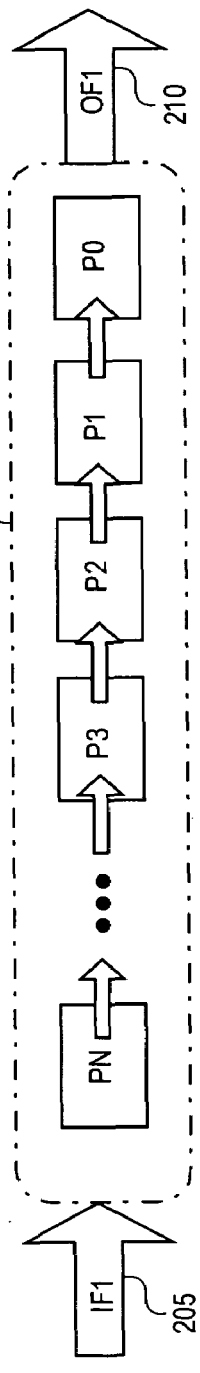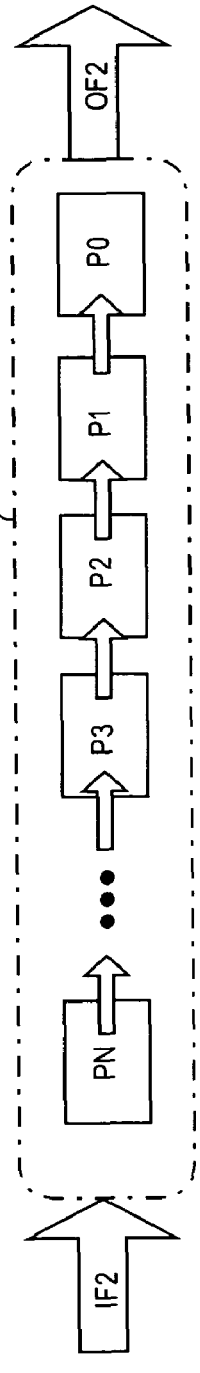
FIG. 2A
FIG. 2B
FIG. 2C

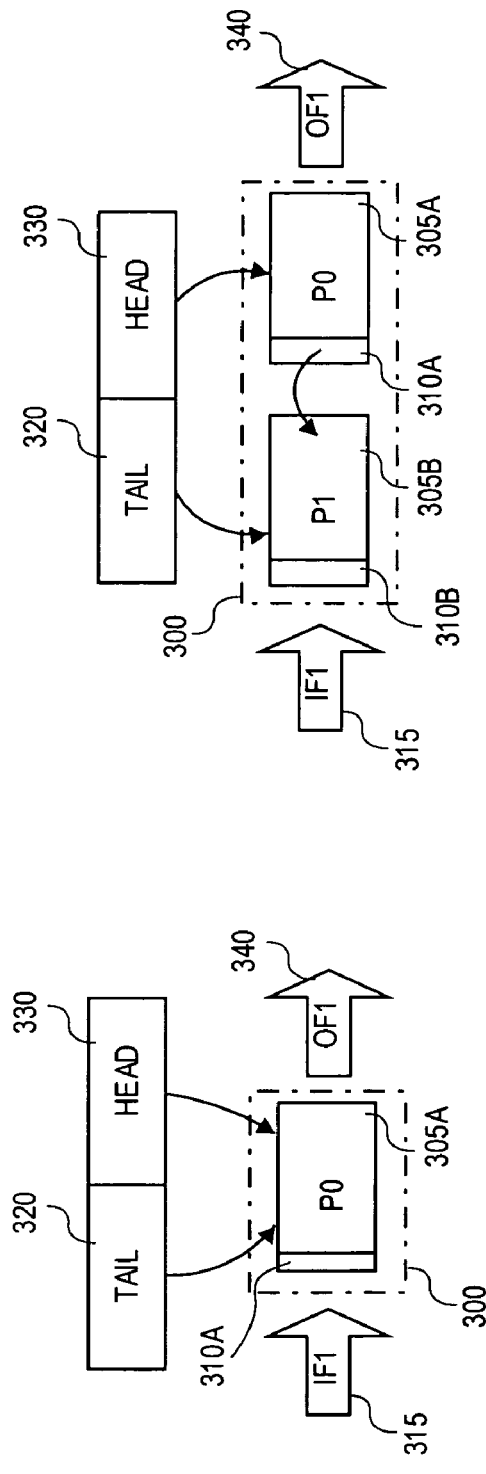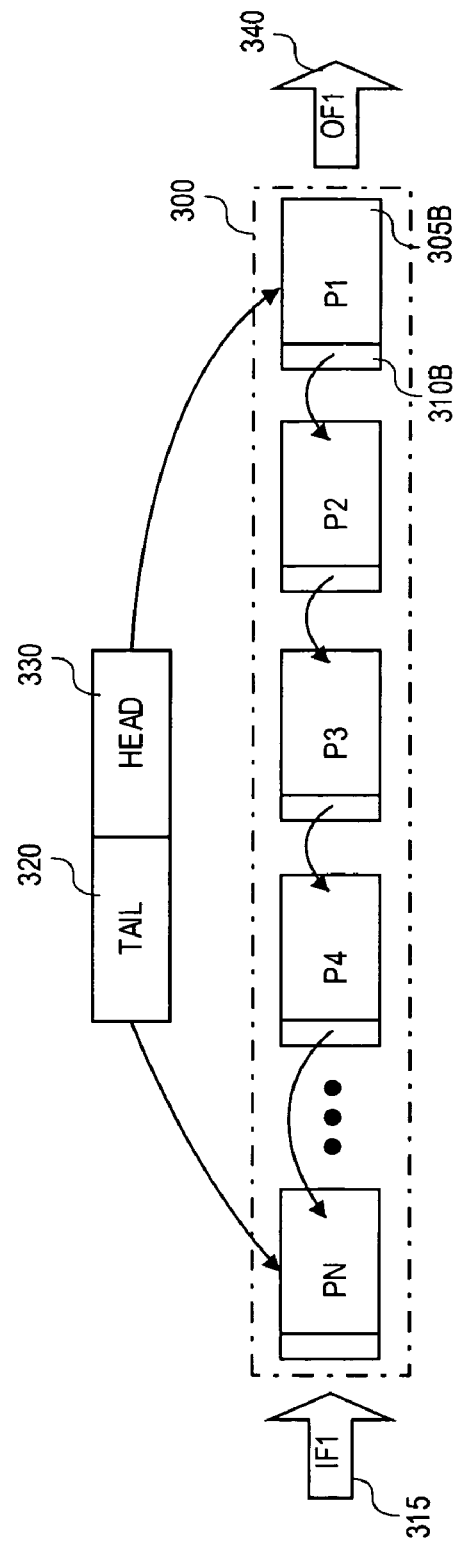

OPTIMIZED BACK-TO-BACK ENQUEUE/DEQUEUE VIA PHYSICAL QUEUE PARALLELISM

TECHNICAL FIELD

This disclosure relates generally to queuing, and in particular but not exclusively, relates to enqueuing and dequeuing packets in network routers.

BACKGROUND INFORMATION

A packet flow entering a network is routed from one router to the next until the packet flow reaches its destination. At any given time, there may be many packet flows traversing the network between many different sources and destinations. To keep track of the packet flows, each router may establish a logical queue and a physical queue for each packet flow the router is forwarding. The logical queue is a logical construct established within software of the router to maintain order and keep track of the individual packets of each packet flow. For each logical queue, the router maintains a physical queue. The physical queue temporarily holds the actual packets themselves or pointers to memory locations within memory of the router where the actual packets are buffered. Thus, there is a one-to-one relationship between a packet flow, its corresponding logical queue, and the corresponding physical queue.

When a router processes multiple packet flows at a given time, parallelism in the hardware of the router itself can be leverage to quickly and efficiently forward inflows to corresponding outflows of multiple packet flows at a given time. However, when any one packet flow is dominant (i.e., consumes a majority of the router bandwidth) the serial nature of enqueuing and dequeuing packets to a single physical queue becomes a significant throughput bottleneck. In fact, single flow throughput performance is a common network benchmark tested by network administrators. Thus, known routers obtain maximum total throughput of packet flows when simultaneously processing multiple packet flows, of which, no one packet flow is dominant.

As bit rates across networks continue to climb, parallelism within routers is key to maintaining full bit rate communication. For example, in packet over SONET ("POS") networks, maintaining optical carrier ("OC")—192 bit rates (approximately 9,953.28 Mbps), requires leveraging hardware parallelism within network routers. As POS networks migrate to OC-768 (approximately 38.813 Gbps), maintaining hardware parallelism will become even more crucial.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2A is a block diagram illustrating a logical queue corresponding to a packet flow through a router, in accordance with an embodiment of the present invention.

FIG. 2B is a block diagram illustrating a logical queue corresponding to a packet flow through a router, in accordance with an embodiment of the present invention.

FIG. 2C is a block diagram illustrating a logical queue corresponding to a packet flow through a router, in accordance with an embodiment of the present invention.

FIG. 3A is a block diagram illustrating a physical queue having a single queue element.

FIG. 3B is a block diagram illustrating the serial creation of a physical queue having a second queue element enqueued to the physical queue.

FIG. 3C is a block diagram illustrating the serial nature of enqueuing a queue element to a single physical queue and dequeuing a queue element from the single physical queue.

DETAILED DESCRIPTION

Figure 1:
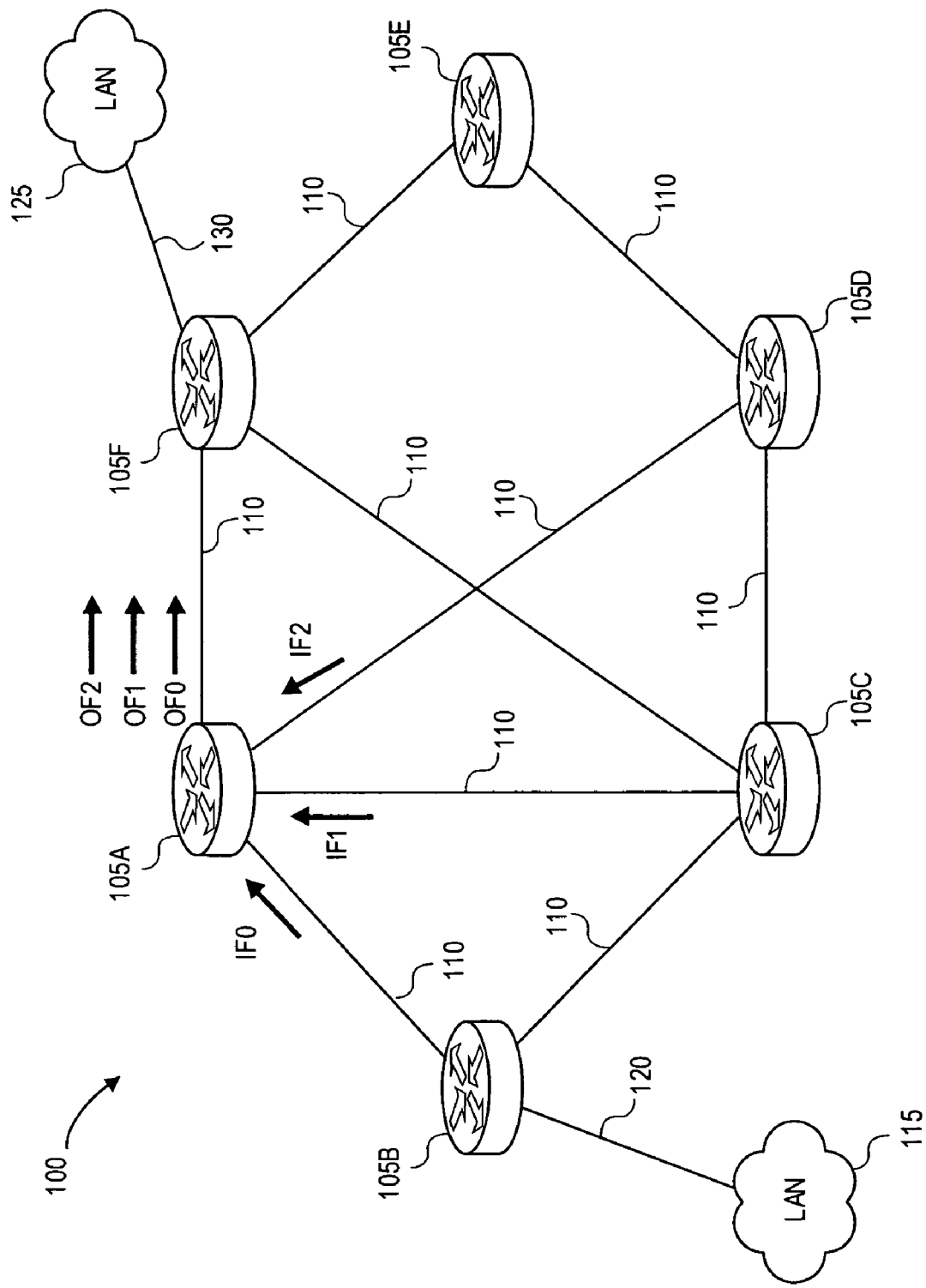
FIG. 1 is a diagram illustrating a network including routers for routing packet flows through the network, in accordance with an embodiment of the present invention.

Embodiments of a system and method for optimizing back-to-back enqueue and dequeue operations by providing multiple physical queues per single logical queue are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. A "packet" is defined herein as a block of data and/or instructions transmitted over a network in a packet-switched system. A "packet flow" is defined herein as a group of packets propagating along a path through a network and which share a common source-destination pair. A "physical queue" is defined herein as a temporary holding place for data and/or instructions within a memory device.

For example, a physical queue can include a physical link list of pointers to other memory locations storing data/instructions or a physical link list of actual data/instructions. "Enqueuing" is defined herein as the act of scheduling a packet within a physical queue to be dequeued at a later time. "Dequeuing" is defined herein as the act of removing the packet from the physical queue. For example, a pointer may be dequeued from a physical queue (e.g., physical link list) to signify that the packet designated by the pointer is or is about to be transmitted on an output port of a router.

In short, embodiments of the present invention provide multiple physical queues corresponding to each logical queue of a packet flow. In one embodiment, enqueues and dequeues to the multiple physical queues for each logical queue are organized such that packets are transmitted in the same order as received. In one embodiment, packet order within a logical queue is stringently maintained by strict ping-pong or round robin schemes for both enqueuing and dequeuing between the multiple physical queues. Maintaining multiple physical queues per logical queue (and therefore per packet flow) leverages hardware parallelism within a router and therefore ameliorates the single flow bottleneck. Embodiments of the present invention are scalable and enable routers to sustain full transmission bit rates even when a single packet flow is dominant. These and other embodiments are described in detail below.

FIG. 1 illustrates a network 100 including routers 105 interconnected by network links 110. In one embodiment, network 100 is a packet over SONET ("POS") wide area network ("WAN"), though embodiments of the present invention may be used in connection with any packet-switched network including wired or wireless, optical or electrical, local area network ("LAN"), WAN, or the Internet. Routers 105 may also couple other LANs to network 100, such as LAN 115 coupled via network link 120 to router 105B and LAN 125 coupled via network link 130 to router 105F. Although network 100 is illustrated with five routers 105, it should be appreciated that network 100 may be scaled to include any number of routers coupled in various different patterns by more or less network links 110.

Routers 105 route packet flows through network 100 from a source to a destination. A packet flow may traverse several routers 105 before reaching its final destination. For example, router 105A is illustrated as routing three packet flows F0, F1, and F2. Each packet flow traversing router 105A includes an inflow into router 105A and an outflow out of router 105A. As illustrated, packet flow F0 traversing router 105A includes inflow IF0 and outflow IF0, packet flow F1 includes inflow IF1 and outflow OF1, and packet flow F2 includes inflow IF2 and outflow OF2. Inflows may arrive at router 105A on separate network links, such as inflows IF0, IF1, and IF2 or multiple packet flows may arrive at router 105 on a single network link. Similarly, outflows may depart router 105 on different network links or outflows may depart from router 105 on a single network link, such as outflows OF0, OF1, and OF2.

FIGS. 2A, 2B, and 2C are block diagrams illustrating logical queues 200A, 200B, and 200C corresponding to packet flows F0, F1, and F2, respectively. Typically, logical queues 200 are conceptual constructs maintained in software executing on routers 105. Logical queues 200 temporarily store individual packets of packet flows F0, F1, F2 which have been received by router 105A, but not yet forwarded along their respective outflows OF0, OF1, OF2. Thus, logical queues 200 are logical constructs for router 105A to track packets queued within memory of router 105A and pending for transmission along a selected one of network links 110.

The operation of logical queues 200 are described in connection with logical queue 200B of FIG. 2B; however, logical queues 200A and 200C operate in a similar manner. Each time a packet is received by router 105A at inflow IF1, router 105A enqueues the packet at enqueue arrow 205 into logical queue 200B. For example, suppose packet P0 is the first packet received by router 105A from packet flow F1. Packet P0 is enqueued at enqueue arrow 205 into logical queue 200B and buffered therein until router 105A is ready to dequeue packet P0 at dequeue arrow 210 for transmission along outflow OF1. If packet P1 arrives along inflow IF1 prior to router 105A dequeuing packet P0, packet P1 is enqueued, added to logical queue 200B, and scheduled into logical queue 200B logically behind packet P0. If the arrival rate of packets along inflow IF1 is greater than the departure rate of packets along outflow OF1, then the number of pending packets within logical queue 200B will grow, until a maximum number is reached. In one embodiment, router 105A will commence statistical packet dropping according to a weighted random early detection ("WRED") as logical queue 200B approaches full capacity.

When router 105A is ready to dequeue packet P0, packet P0 is removed from logical queue 200B and transmitted along outflow OF1. Upon dequeuing packet P0 at dequeue arrow 210, the remaining pending packets shift forward making room for a new packet to be enqueued into logical queue 200B and packet P1 become the next packet to be dequeued for transmission along outflow OF1. Thus, in one embodiment, logical queue 200B is a first-in-first-out ("FIFO") logical queue.

FIG. 3A is a block diagram illustrating a physical queue 300 having a single queue element P0. Queue element P0 corresponds to packet P0 in logical queue 200B (FIG. 2B). In one embodiment, queue element P0 includes a packet pointer 305A and a next element pointer 310A. Packet pointer 305A is a pointer to a memory location within router 105A containing an actual packet received via inflow IF0. Next element pointer 310A is a portion of queue element P0 which points to the next queue element within physical queue 300, unless queue element P0 is the last or only element in physical queue 300. In FIG. 3A, queue element P0 is the only queue element pending in physical queue 300. Therefore, next element pointer 310A contains a NULL entry or a NULL pointer to a memory location within router 105A containing a NULL entry.

Although embodiments of the present invention are described herein in connection with queue elements containing packet pointers, it should be appreciated that packet pointers 305A could be replaced with the actual packets received along inflow IF1. Thus, in an alternative embodiment, queue element P0 includes a packet portion containing data and/or instructions for transmission along outflow OF1 and next element pointer 310A. In this alternative embodiment, the actual packets from packet flow F1 are enqueued into physical queue 300 in place of packet pointers 305.

FIG. 3B is a block diagram illustrating the serial creation of physical queue 300. In FIG. 3B, a second queue element P1 has been enqueued into physical queue 300. Queue element P1 is enqueued into physical queue 300 at enqueue arrow 315. Enqueuing queue element P1 into physical queue 300 schedules queue element P1 to be dequeued at a future time after queue element P0. Furthermore, upon enqueuing queue element P1 to physical queue 300, next element pointer 310A of queue element P0 is updated to reference queue element P1 as the next queue element. The NULL entry or NULL pointer is inserted into next element pointer 310B of queue element P1. Thus, queue elements P0 and P1 form a physical link list of packet pointers 305, since queue element P0 is linked to queue element P1 via next element pointer 310A.

Additionally, in one embodiment, a tail pointer 320 is maintained by router 105A to track where the next queue element should be enqueued into physical queue 300. Thus, in one embodiment, tail pointer 320 always points to the last queue element within physical queue 300. In one embodiment, a head pointer 330 is also maintained by router 105A to track which queue element within physical queue 300 is the next queue element to dequeue at dequeue arrow 340.

FIG. 3C is a block diagram illustrating the serial nature of enqueuing a queue element to physical queue 300 and dequeuing a queue element from physical queue 300. As illustrated in FIG. 3C, queue element P0 has been dequeued at dequeue arrow 340 and queue element P1 moved to the front of physical queue 300. Furthermore, physical queue 300 has grown to include queue element P1 through PN, where queue element PN represents the $n^{th}$ queue element enqueued into physical queue 300. Head pointer 330 has been updated to point to queue element P1, reflecting that queue element P1 is now the next queue element to be dequeued from physical queue 300. Tail pointer 320 has also been updated to point to queue element PN, reflecting that queue element PN is the last queue element enqueued into physical queue 300.

As can be seen from FIGS. 3B and 3C, enqueuing and dequeuing queue elements to/from physical queue 300 are serial processes. Only one queue element is enqueued to physical queue 300 at a time and one queue element is dequeued at a time. Maintaining full OC-192 or higher bit rates through a single packet flow, such as packet flow F1, using only a single physical queue 300 places a demanding task on the hardware of router 105A. The enqueuing process at enqueue arrow 315, the dequeuing process at dequeue arrow 340, and the memory access times to retrieve the actual data packets from the memory of router 105A all place upper limits on the throughput of a single packet flow F1, if only a single physical queue 300 is allocated per logical queue 200 (and therefore per packet flow).

To address this shortcoming, embodiments of the present invention allocate multiple physical queues per logical queue (and therefore per packet flow) to ameliorate the serialization bottleneck. Therefore, even when a single one of packet flows F0, F1, and F2 is dominant, the enqueuing, dequeuing, and the memory access times are parallelized across multiple physical queues. Embodiments of the present invention enable use of slower, less expensive hardware working in parallel to enqueue, dequeue, and retrieve physical packets from memory at full OC-192 bit rates or higher.

Figure 4:
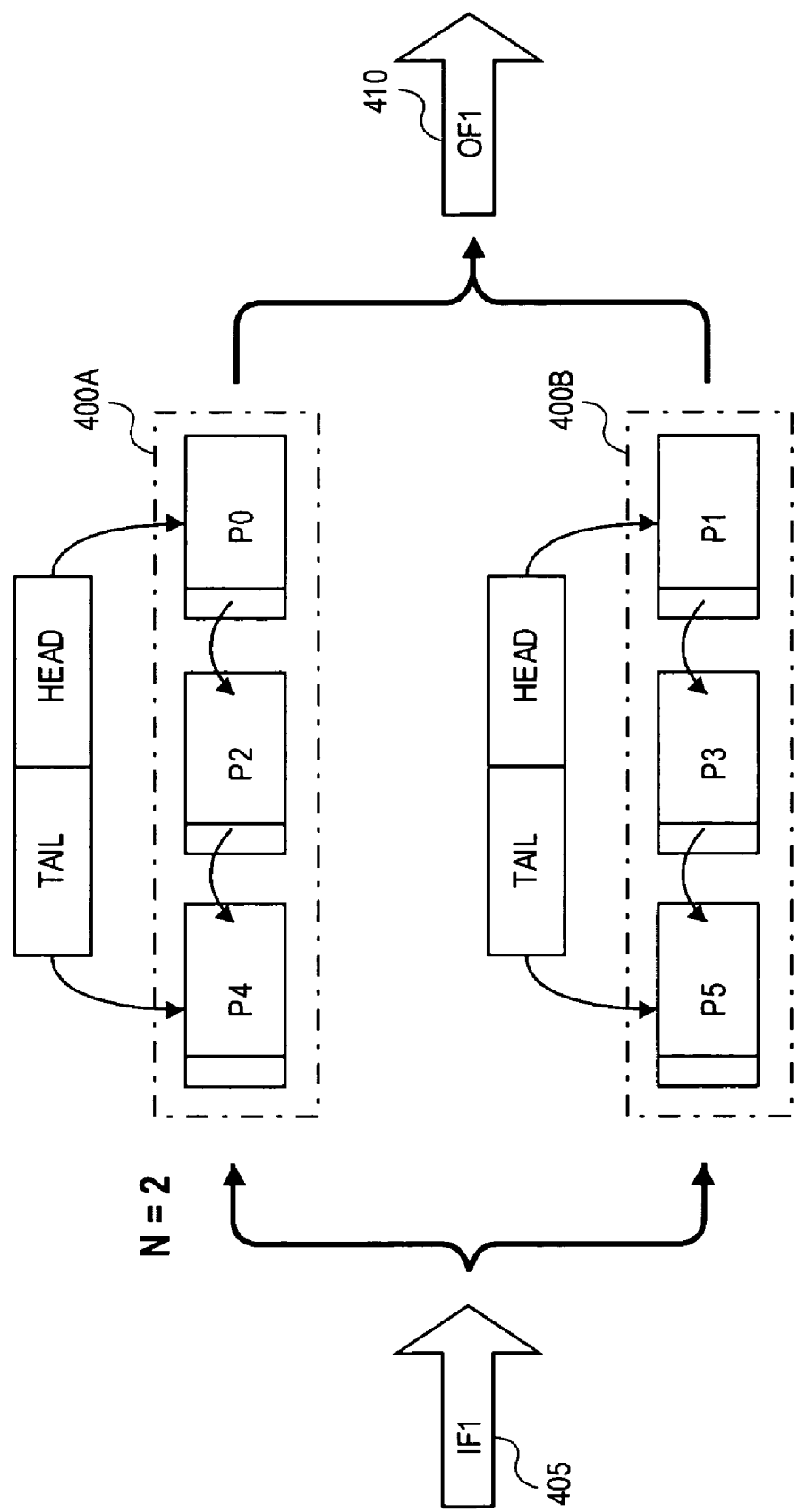
FIG. 4 is a block diagram illustrating enqueuing and dequeuing queue elements corresponding to a single logical queue to/from multiple physical queues, in accordance with an embodiment of the present invention.

FIG. 4 is a block diagram illustrating enqueuing and dequeuing queue elements of logical queue 200B into multiple physical queues 400A and 400B, in accordance with an embodiment of the present invention. Although FIG. 4 illustrates only two physical queues 400A and 400B, embodiments of the present invention include any number of physical queues corresponding to a single logical queue.

FIG. 4 illustrates queue elements P0 through P5 of packet flow F1 already alternately queued into physical queues 400A and 400B. Queue element P0 was enqueued into physical queue 400A at enqueue arrow 405. The next packet received along inflow IF1 of packet flow F1 corresponds to queue element P1. Queue element P1 was enqueued at enqueue arrow 405 into physical queue 400B. Thus, in the illustrated embodiment where N=2 (N representing the number of physical queues per packet flow) the individual queue elements are enqueued into physical queues 400A and 400B in a ping-pong fashion. Thus, all the evenly numbered queue elements (e.g., P0, P2, P4, etc.) of packet flow F1 are enqueued into physical queue 400A, while all the odd numbered queue elements (e.g., P1, P3, P5, etc.) are enqueued into physical queue 400B.

Similarly, queue elements P0 through P5 will be dequeued at a dequeue arrow 410 in the same order as they were enqueued. Thus, in the case where N=2 queue elements P0 through P5 will be dequeued in a ping-pong fashion between physical queues 400A and 400B, starting with queue element P0. Dequeuing queue elements P0 through P5 in the same order as enqueuing ensures the packets of packet flow F1 are transmitted along outflow OF1 in the same order as they were received along inflow IF1.

In embodiments where N>2, the queue elements may be enqueued and dequeued into the multiple physical queues using a round robin scheme. A round robin scheme includes iterative rounds. During each round a single queue element is enqueued to each physical queue in a sequentially manner. Once all physical queues have received one queue element, the instant round is complete and the next iterative round commences. The sequence of enqueuing queue elements to the multiple physical queues is consistent from one round to the next. Similarly, pending queue elements are dequeued in the same round robin manner to ensure that all the multiple physical queues collectively act as a FIFO queue to the outside world. Thus, embodiments of the present invention ensure queue elements from a single packet flow (e.g., queue elements P0 through P5 of packet flow F1) are dequeued from physical queues 400A and 400B in the same order as they were enqueued into physical queues 400A and 400B. This stringent ordering is maintained via strict round robin (or ping-pong when N=2) schemes for both enqueuing and dequeuing.

Figures 5A, 5B, 5C:
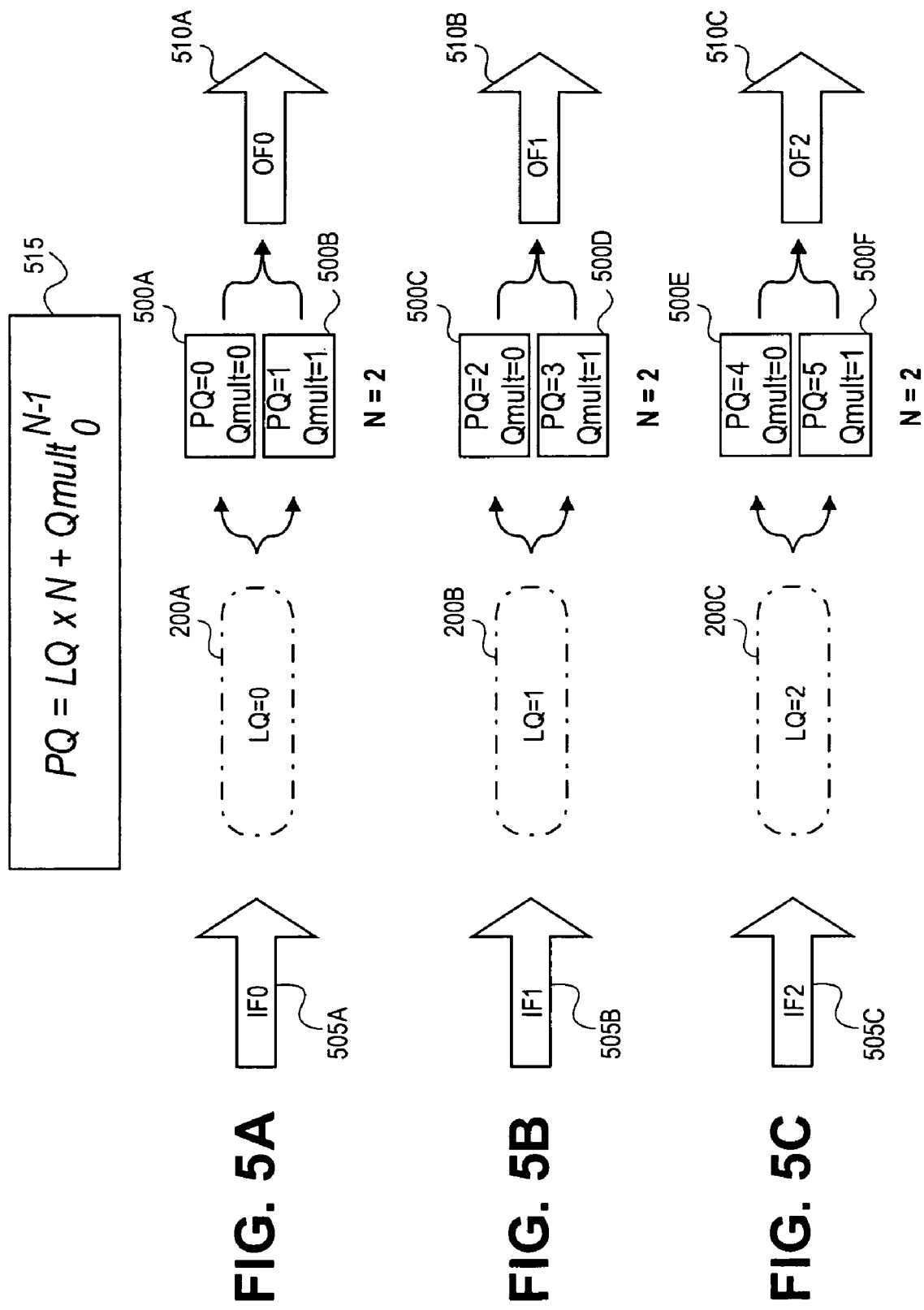
FIG. 5A is a block diagram illustrating enqueuing and dequeuing to/from multiple physical queues of a packet flow, in accordance with an embodiment of the present invention.
FIG. 5B is a block diagram illustrating enqueuing and dequeuing to/from multiple physical queues of a packet flow, in accordance with an embodiment of the present invention.
FIG. 5C is a block diagram illustrating enqueuing and dequeuing to/from multiple physical queues of a packet flow, in accordance with an embodiment of the present invention.

FIGS. 5A, 5B, and 5C are block diagrams illustrating enqueuing and dequeuing to/from multiple physical queues 500 corresponding to multiple packet flows F0, F1, and F2, in accordance with an embodiment of the present invention. In FIG. 5A, physical queues 500A and 500B correspond to logical queue 200A, which receives packets from inflow IF0. The queue elements of packet flow F0 are enqueued into physical queues 500A and 500B at enqueue arrow 505A and dequeued at dequeue arrow 510A for transmission along outflow OF0. In FIG. 5B, physical queues 500C and 500D correspond to logical queue 200B, which receives packets from inflow IF1. The queue elements of packet flow F1 are enqueued into physical queues 500C and 500D at enqueue arrow 505B and dequeued at dequeue arrow 510B for transmission along outflow OF1. In FIG. 5C, physical queues 500E and 500F correspond to logical queue 200C, which receives packets from inflow IF2. The queue elements of packet flow F2 are enqueued into physical queues 500E and 500F at enqueue arrow 505C and dequeued at dequeue arrow 510C for transmission along outflow OF2. Thus, FIGS. 5A, 5B, and 5C illustrate the logical queues and corresponding physical queues of router 105A for an embodiment of the present invention where N=2.

When packets from flows F0, F1, and F2 arrive at router 105A, the packets are buffered within memory of router 105A and queue elements containing pointers to the packets are enqueued into physical queues 500A-F. The queue elements are enqueued into physical queues 500A-F by router 105A according to equation 515. Equation 515 relates a particular physical queue (represented by PQ) to a particular logical queue (represented by LQ) for a given value of N and Qmult. Qmult is a variable that ranges from 0 to N−1 and which increments (or decrements) by 1 each time a packet for a given packet flow arrives at router 105A. For the purposes of enqueuing, router 105A maintains a separate Qmult value for each of packet flows F0, F1, and F2. In the illustrated example where N=2, Qmult may be thought of as a ping-pong bit which cycles each time a queue element is enqueued into one of physical queues 500.

For example, if the first three packets of packet flow F1 arrive at router 105A along inflow IF1, the packets will be buffered into memory of router 105A and queue elements pointing to the packets will be enqueued into physical queues 500C and 500D as follows. The first queue element pointing to the first packet will be enqueued using the values LQ=1, N=2, Qmult=0. Therefore, PQ=1×2+0=2. Thus, the first queue element is enqueued into physical queue 500C. Upon enqueuing the first queue element, Qmult is incremented by 1. The second queue element pointing to the second packet will be enqueued using the values LQ=1, N=2, Qmult=1. Therefore, PQ=1×2+1=3. Thus, the second queue element is enqueued into physical queue 500D. Again, Qmult is increment by 1 upon enqueuing the second queue element. However, in this example, Qmult only ranges from 0 to N−1 (i.e., 0 or 1) therefore Qmult loops back to 0. The third queue element pointing to the third packet will be enqueued using the values LQ=1, N=2, Qmult=0. Therefore, PQ=1×2+0=2. Thus, the third queue element is enqueued into physical queue 500C.

Equation 515 is equally applicable to dequeuing queue elements from physical queues 500A-F. Router 105A maintains a second Qmult value for each of packet flows F0, F1, and F2 for the purposes of dequeuing. For the illustrated example of FIGS. 5A-C, router 105A would maintain six independent values of Qmult—one for enqueuing and one for dequeuing for each of packet flows F0, F1, and F2.

Figure 6:
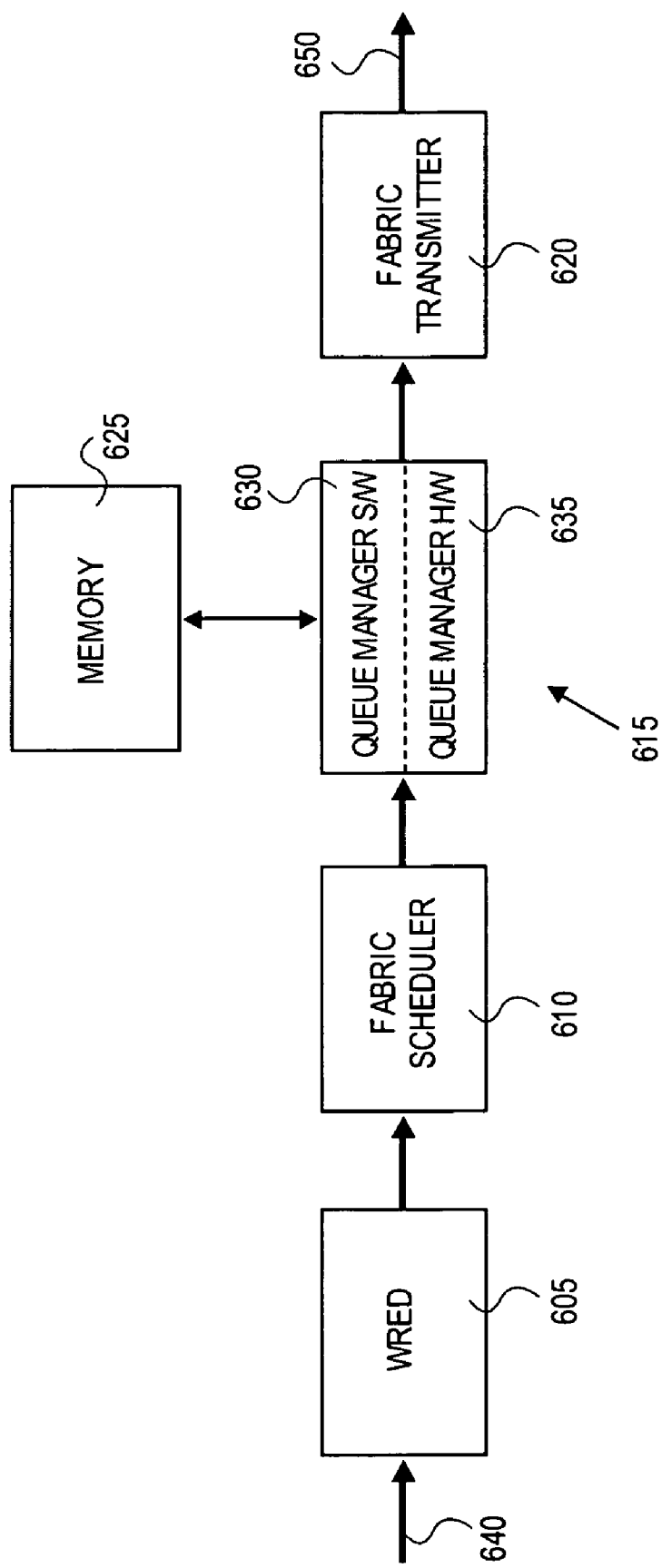
FIG. 6 is a block diagram illustrating functional blocks of an embodiment of a router to maintain multiple physical queues per logical queue, in accordance with an embodiment of the present invention.

FIG. 6 is a block diagram illustrating functional blocks of one embodiment of router 105A, in accordance with the teachings of the present invention. In the illustrated embodiment, router 105A includes a WRED block 605, a fabric scheduler 610, a queue manager 615, a fabric transmitter 620, and memory 625. Queue manager 615 may include one or both of a software component 630 and a hardware component 635. In one embodiment, memory 625 is a static random access memory ("SRAM") module, though other types of RAM may be used. It should be appreciated that various other functional elements of router 105A may have been excluded from FIG. 6 for the purpose of clarity and this discussion. FIG. 6 is not intended to be an exhaustive schematic detailing every functional block of router 105A; but rather, a high level discussion of the functional operation of one embodiment of router 105A.

WRED 605 receives packets from packet flows at an input port 640 and dependent upon a number of factors either forwards the packet to fabric scheduler 610 or drops the packet. WRED 605 performs TCP flow control. One such drop factor is the size of the logical queue corresponding to the packet flow to which the packet belongs. If the logical queue approaches a certain threshold number, WRED 605 will began randomly dropping packets arriving for that logical queue based on a certain probability. The probability of dropping a packet bound for one logical queue may not be equal to a packet bound for another logical queue, due in part to a variance in size between their logical queues and in part to a weighted priority assigned to each logical queue.

Fabric scheduler 610 schedules packets received from WRED 605 for enqueuing into the various different physical queues. Fabric scheduler 610 may implement one of many different scheduling schemes to perform efficient and fair scheduling between a plurality of packet flows received at input port 640. Such scheduling schemes include simple round robin scheduling, weighted round robin scheduling, deficit round robin scheduling ("DRR"), pre-sort DRR, and the like. In one embodiment, fabric scheduler 610 schedules entire packets for enqueuing at a time. In an alternative embodiment, fabric scheduler 610 divides each packet, which may be 1000 bytes, into cells of 64 bytes and schedules the individuals cells for enqueuing. Fabric scheduler 610 further schedules packets/cells for dequeuing.

Queue manager 615 performs the physical enqueuing and dequeuing operations scheduled by fabric scheduler 610. Queue manager 615 may optionally include one or both of software component 630 and hardware component 635. In one embodiment, queue manager 615 performs the translation of a logical queue to multiple physical queues. This translation may be internal to queue manager 615 and performed without knowledge of the surrounding functional blocks of router 105A. In one embodiment, the actual packets may be buffered in memory 625 and pointed to by queue elements established in physical queues by queue manager 615. Fabric transmitter 620 transmits the actual packets dequeued by queue manager 615 along an output port 650.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:

receiving multiple packet flows, each one of the multiple packet flows including a plurality of packets;

enqueuing a plurality of packet pointers for each of the multiple packet flows into multiple link lists, each one of the plurality of packet pointers designating one of the plurality of packets of each of the multiple packet flows; and dequeuing the plurality of packet pointers for each of the multiple packet flows from each of the multiple link lists to transmit each of the plurality of packets along a corresponding outflow of each of the multiple packet flows, wherein enqueuing the plurality of packet pointers for each of the multiple packet flows further comprises enqueuing each of the plurality of packet pointers into the multiple link lists according to the following relation, $$PQ = (LQ \times N) + Q\text{mult}$$

wherein PQ represents a link list number of one of the multiple link lists, LQ represents a logical queue number corresponding to one of the multiple packet flows, N represents a number of the multiple link lists per each one of the multiple packet flows, and Qmult differentiates between each one of the multiple link lists of each of the multiple packet flows.

2. The method of claim 1 wherein enqueuing the plurality of packet pointers for each of the multiple packet flows into the multiple link lists further comprises enqueuing the plurality of packet pointers for each of the multiple packet flows into the multiple link lists using a round robin enqueuing scheme between the multiple link lists.

3. The method of claim 2 wherein dequeuing the plurality of packet pointers for each of the multiple packet flows from each of the multiple link lists further comprises dequeuing the plurality of packet pointers for each of the multiple packet flows from the multiple link lists in a same order as enqueuing the plurality of packet pointers into the multiple link lists.

4. The method of claim 1 wherein the multiple link lists for each of the multiple packet flows comprise two link lists and wherein enqueuing the plurality of packet pointers into the multiple link lists for each of the multiple packet flows further comprises alternating enqueues of each of the plurality of packet pointers for each of the multiple packet flows between the two link lists.

5. The method of claim 4 wherein dequeuing the plurality of packet pointers for each of the multiple packet flows from the two link lists further comprises alternating dequeues of each of the plurality of packet pointers for each of the multiple packet flows from the two link lists in a same order as the alternating enqueues.

6. The method of claim 1 wherein the multiple link lists comprise multiple physical link lists having multiple link list elements, each link list element including one of the plurality of packet pointers and a next element pointer.

7. The method of claim 1 wherein each of the multiple packet flows comprises a single data packet flow along a network path.

8. A method, comprising:
receiving multiple pluralities of packets from corresponding multiple packet inflows;
enqueuing each of the multiple pluralities of data packets from the corresponding multiple packet inflows into corresponding multiple physical queues; and
dequeuing each of the multiple pluralities of packets from the corresponding multiple physical queues to transmit each of the multiple pluralities of packets alone corresponding packet outflows,
wherein enqueuing each of the multiple pluralities of data packets comprises enqueuing each of the multiple pluralities of packets into the corresponding multiple physical queues according to the following relation, $PQ=(LQ \times N)+Q\text{mult}$ wherein PQ represents a physical queue number of one of the corresponding multiple physical queues, LQ represents a logical queue number corresponding to one of the multiple packet inflows, N represents a number of the corresponding multiple physical queues per each of the multiple packet inflows, and Qmult differentiates between each one of the multiple physical queues of each of the multiple packet inflows.

9. A machine-accessible medium that provides instructions that, if executed by a machine, will cause the machine to perform operations comprising:
enqueuing a plurality of packet pointers into multiple physical queues, the plurality of packet pointers each point to a memory location temporarily having stored therein one of a corresponding plurality of packets, the corresponding plurality of packets received from a packet flow via a first network link; and
dequeuing the plurality of packet pointers from the multiple physical queues to transmit the plurality of packets onto a second network link,
wherein the packet pointers are enqueued into the multiple physical queues according to the following relation, $PQ=(LQ \times N)+Q\text{mult}$ wherein PQ represents a physical queue identifier, LQ represents a logical queue identifier, N represents a number of the multiple physical queues assigned per logical queue, and Qmult differentiates between the multiple physical queues assigned to each logical queue.

10. The machine-accessible medium of claim 9 wherein enqueuing the plurality of packet pointers into the multiple physical queues comprises enqueuing the plurality of packet pointers into the multiple physical queues using a round robin enqueuing scheme between the multiple physical queues.

11. The machine-accessible medium of claim 10 wherein dequeuing the plurality of packet pointers from the multiple physical queues comprises dequeuing the plurality of packet pointers from the multiple physical queues using a round robin dequeuing scheme between the multiple physical queues.

12. The machine-accessible medium of claim 9 wherein the dequeuing of the plurality of packet pointers from the multiple physical queues is executed in a same order as the enqueuing of the plurality of packet pointers.

13. The machine-accessible medium of claim 9, further providing instructions that, if executed by the machine, will cause the machine to perform operations, comprising:
enqueuing the plurality of packet pointers into the multiple physical queues for each of multiple packet flows, each of the plurality of packet pointers to point to one of the plurality of memory locations temporarily having stored therein one of the plurality of packets received from one of the multiple packet flows; and
dequeuing the plurality of packet pointers from the multiple physical queues for each of the multiple packet flows to transmit the plurality of packets of each of the multiple packet flows.

14. The machine-accessible medium of claim 13 wherein the multiple packet flows are all transmitted along multiple network links.

15. The machine-accessible medium of claim 9 wherein the multiple physical queues comprise multiple link lists.

16. A router, comprising:
a first port to receive a plurality of packets;
a memory unit to temporarily queue the plurality of packets;
a queue manager to enqueue a plurality of packet pointers, each one of the plurality of packet pointers to point to one of the plurality of packets temporarily queued, the queue manager to enqueue the plurality of packet pointers into multiple link lists according to PQ=(LQ× N)+Qmult, wherein PQ represents a link list identifier, LQ represents a logical queue identifier of a packet flow, N represents a number of the multiple link lists assigned per logical queue, and Qmult differentiates between the multiple link lists assigned to each logical queue; and a second port to transmit the plurality of packets thereon, each of the plurality of packets to be transmitted in response to the queue manager dequeuing one of the plurality of packet pointers.

17. The router of claim 16 wherein the queue manager is further to enqueue the plurality of packet pointers into the multiple link lists using a round robin enqueuing scheme between the multiple link lists.

18. The router of claim 17 wherein the queue manager is further to dequeue the plurality of packet pointers from the multiple link lists in a same order as enqueuing the plurality of packet pointers.

19. The router of claim 16 wherein the queue manager comprises hardware entity.

20. The router of claim 19 wherein the queue manager further comprises a software entity.

21. A system, comprising:
  a plurality of optical routers, each of the plurality of optical routers comprising:
    a first port to receive a plurality of packets of a packet flow;
    a memory unit to temporarily queue the plurality of packets of the packet flow;
    a queue manager to enqueue a plurality of packet pointers, each one of the plurality of packet pointers to point to one of the plurality of packets temporarily queued, the queue manager to enqueue the plurality of packet pointers into multiple physical queues according to $PQ=(LQ \times N)+Qmult$, wherein PQ represents a physical queue identifier, LQ represents a logical queue identifier of a packet flow, N represents a number of the multiple physical queues assigned per logical queue, and Qmult differentiates between the multiple physical queues assigned to each logical queue; and
    a second port to transmit the plurality of packets thereon, each of the plurality of packets to be transmitted in response to the queue manager dequeuing one of the plurality of packet pointers; and
  a plurality of optical fibers to link the plurality of optical routers into a network, the first port and the second port of each of the plurality of routers each coupled to one of the plurality of optical fibers.

22. The system of claim 21 wherein the queue manager is further to enqueue the plurality of packet pointers into the multiple physical queues using a round robin enqueuing scheme between the multiple physical queues.

23. The system of claim 22 wherein the queue manager is further to dequeue the plurality of packet pointers from the multiple physical queues in a same order as enqueuing the plurality of packet pointers.

* * * * *